March 28, 1944.    H. E. MORTON    2,345,060
CUTTING MACHINE
Filed Jan. 2, 1941    4 Sheets-Sheet 1

Inventor
Henry Earl Morton
Bartlett & Hughes
Attorneys

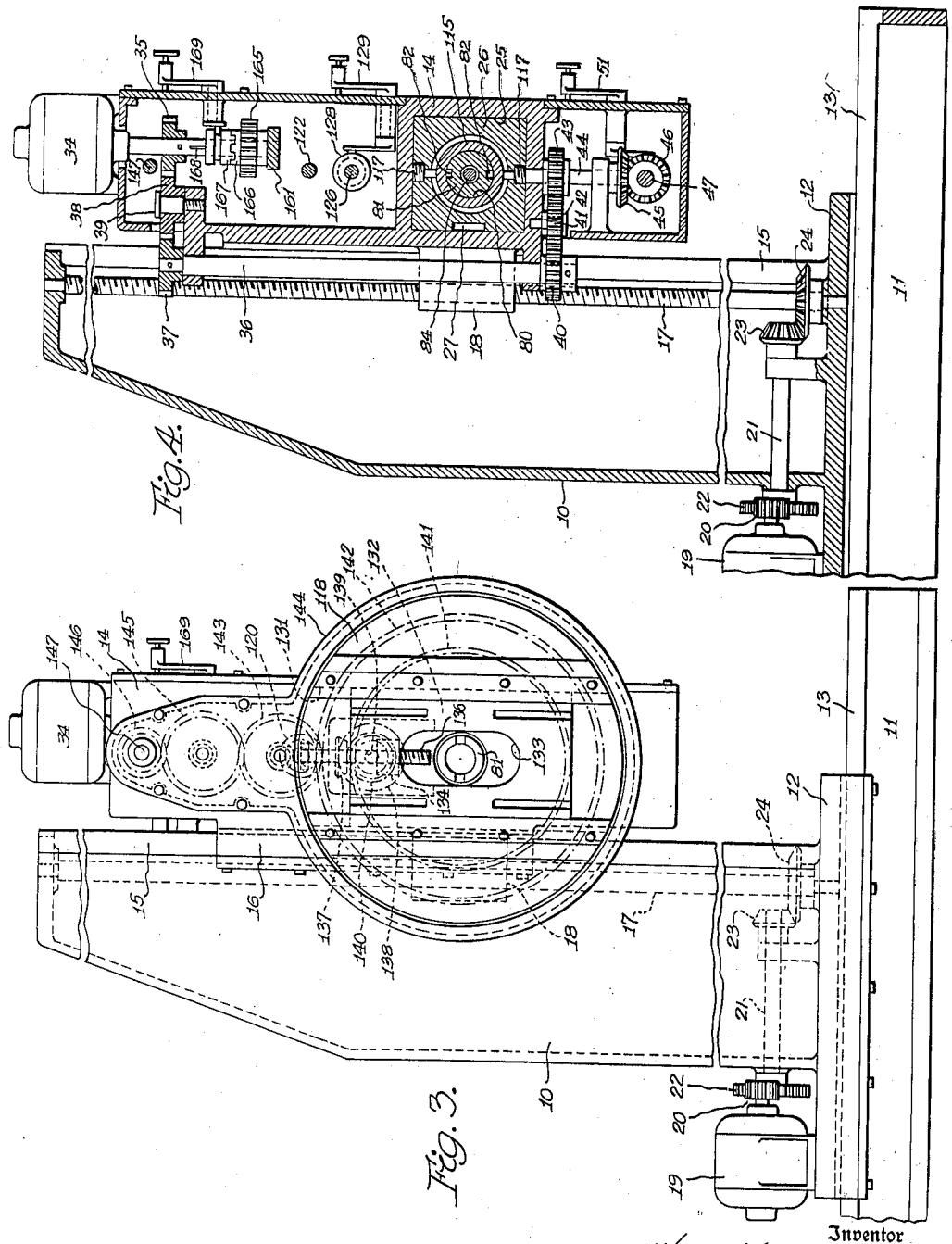

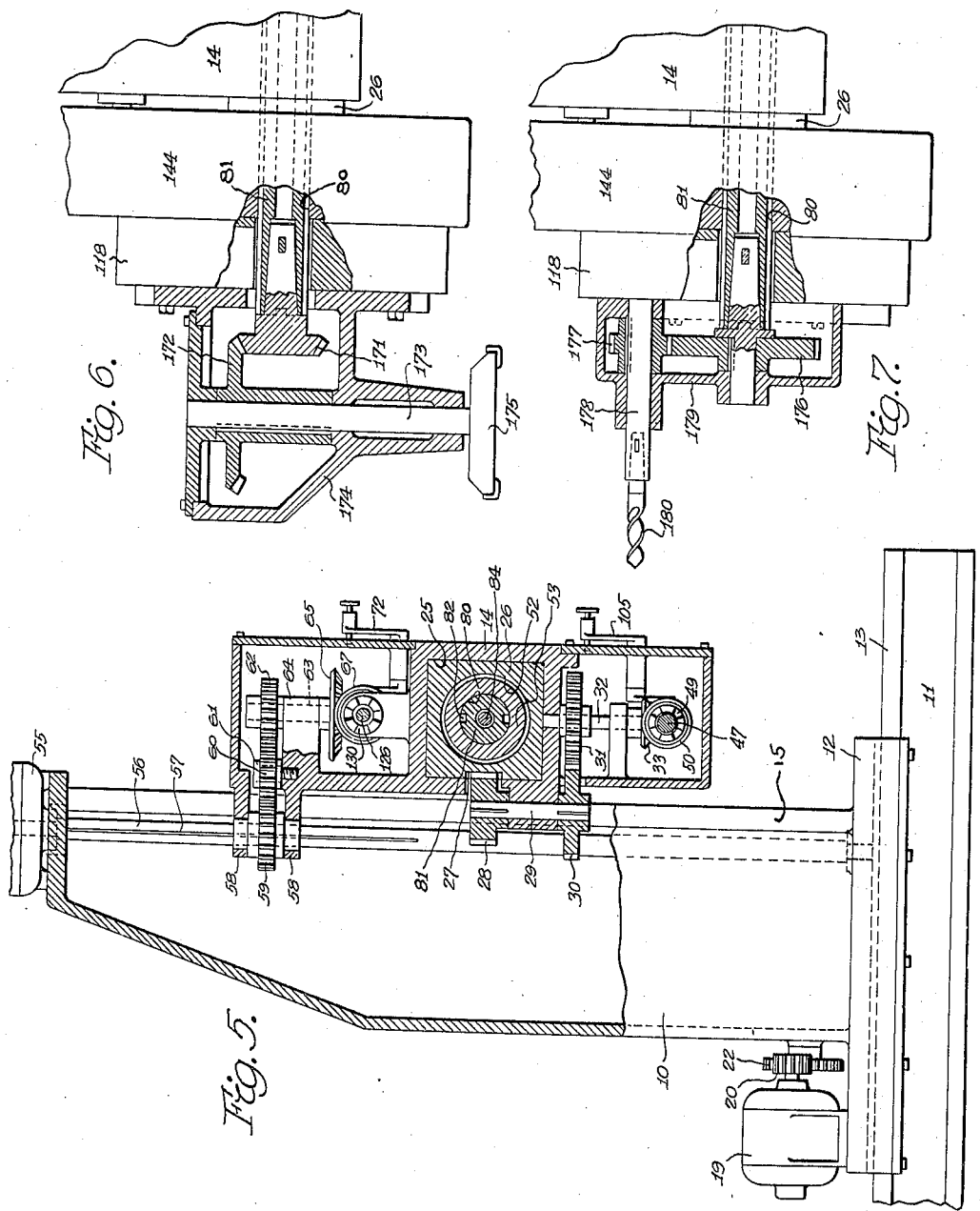

Patented Mar. 28, 1944

2,345,060

UNITED STATES PATENT OFFICE 2,345,060

CUTTING MACHINE

Henry Earl Morton, Muskegon Heights, Mich.

Application January 2, 1941, Serial No. 372,797

10 Claims. (Cl. 29—26)

This invention relates, in general, to cutting machines and, in particular, to new and improved supporting structures for the tools thereof.

One of the objects of this invention is to provide a new and improved cutting machine which is capable of performing any duty upon which it is called to perform with greater ease, speed and success than heretofore.

Another object is to provide a new and improved cutting machine which has a simpler and more compact construction, a greater selection of performable duties, more facile modes of performing said duties and a higher operating efficiency than present machines of a similar type.

Another object is to provide a new and improved cutting machine in which is embodied a plurality of rotatable, rectilinearly movable cutting tools and which movements may be so selectively controlled and so usefully applied as to provide a wider range of performable duties and to obtain a higher operating efficiency than are possible with present machines of a similar type.

Another object is to improve a cutting machine employing a plurality of cutting tools so that said tools, in order to increase the scope of their usefulness, may be moved uni-directionally and/or poly-directionally either unitarily or individually relatively to the work for which they are adapted.

Another object is to provide a cutting machine which is equipped with a pair of cutting tools so novelly supported and controllably driven as to be rotatable about and/or axially movable along a common axis either unitarily or separately, selectively employable either together or individually and movable relatively one to the other in a direction normal to said axis.

Figures 1, 8:
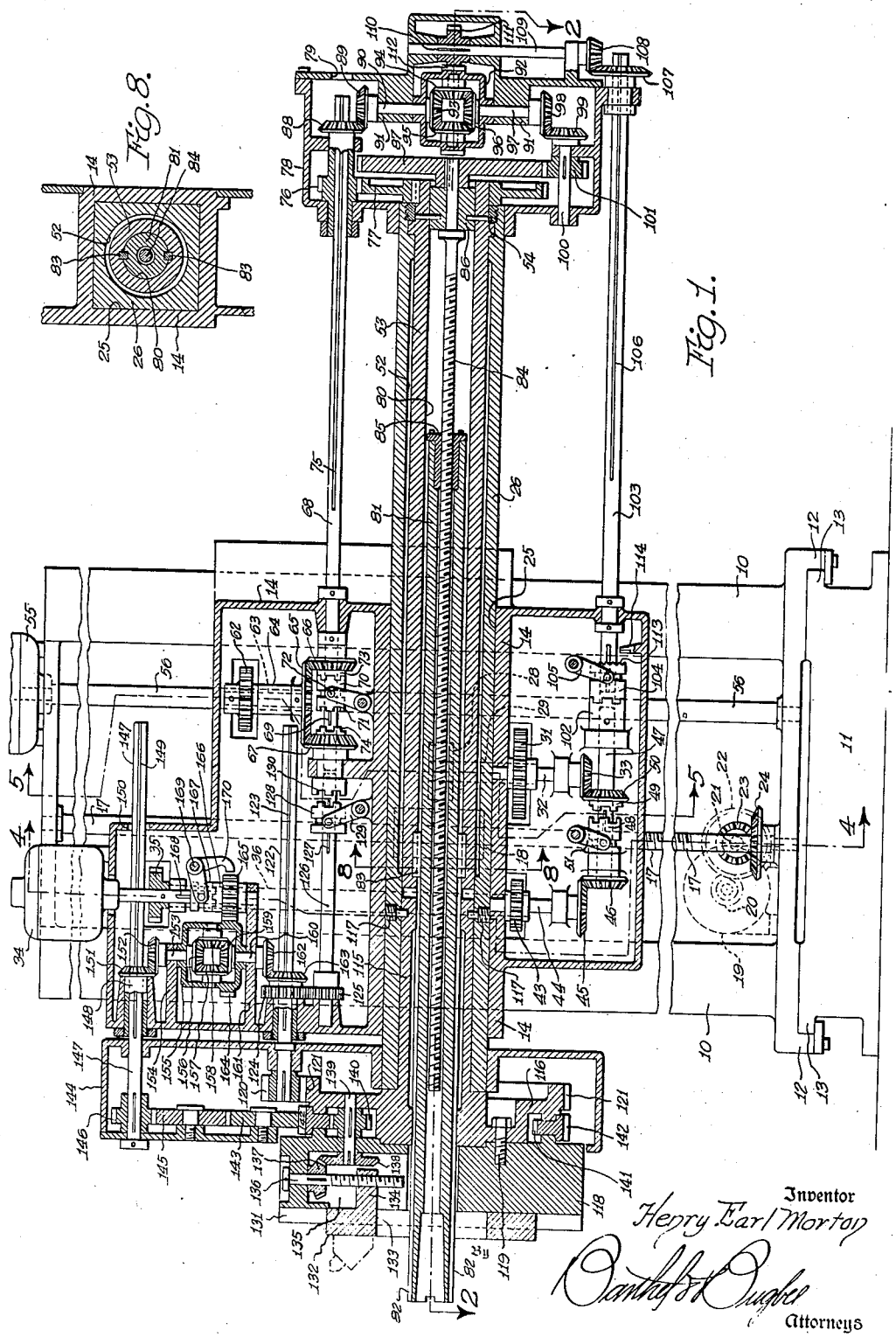
Figure 2:
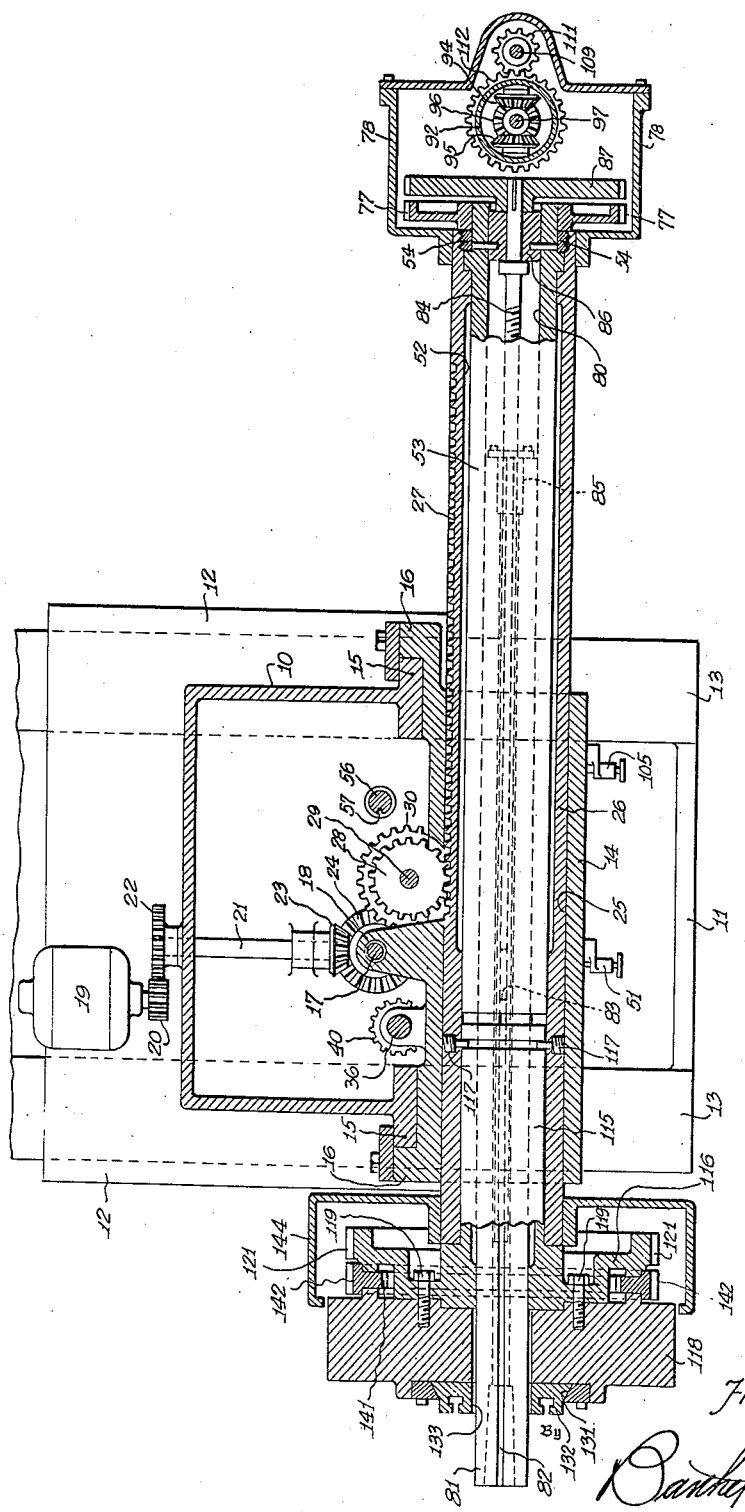

Other objects and advantages of the invention will become readily apparent from a reference to the following specification taken in conjunction with the accompanying drawings of which there are four (4) sheets and wherein:

Figure 1 is a vertical sectional view of the machine and shows the ram and the structure supported thereby in retracted position with respect to the supporting saddle;

Figs. 2, 4, 5 and 8 are sectional views taken along the lines 2—2, 4—4, 5—5 and 8—8. respectively, in Fig. 1;

Fig. 3 is a vertical elevational view of the left or front end of the machine as it is shown in Fig. 1; and Figs. 6 and 7 show a pair of modified constructions adaptable for employment with the spindle shown in the above described figures.

Referring now to the figures, the cutting machine comprises, in part, a vertically upstanding column or support 10 of frame-work construction which is carried on and preferably secured to a base 11, such as by means of interconnected guides 12 and 13, for selective, horizontal movement relatively thereto. The machine also comprises a saddle or support 14 which is carried by and secured to column 10, such as by means of interconnected guides 15 and 16, so as to be vertically movable relatively thereto. This vertical movement of saddle 14 relatively to column 10 is provided for because of the desirability of cutting tool adjustability (as far as its level is concerned) and is effectuated in part by means of a screw drive 17 which extends vertically between and in journaled engagement with the upper and lower portions of said column and is threadedly connected intermediate its ends to a boss 18 formed integral with said saddle. Various means may be provided for rotating screw 17 about its axis in either of its two possible directions, but the means shown are preferred, namely, a motor-pinion unit 19—20 carried by the base of column 10 (the motor being preferably rotatable in either of its two possible directions), a horizontal shaft 21 supported in bearings formed on said column and carrying a gear 22 at one of its ends in driven mesh with said pinion and a pinion 23 at the other of its ends, and a gear 24 carried on the lower end of said screw in driven mesh with said second pinion, the employment of pinion-gear unit 20—22 being for the purpose of reducing the speed of said screw. It is, therefore, clear that rotation of motor 19 in either of its two directions causes saddle 14 to move vertically in either of its two directions relatively to column 10.

Vertically movable saddle 14 is elongated in the direction of what will be found to be tool travel and is formed therethrough with a bore 25 of polygonal cross section having a horizontal axis extending in said direction. Bore 25 is operable for receiving an elongated ram 26 which is externally shaped complementarily thereto so as to negative any tendency of said ram to move about its axis relatively to said bore, and it is to be noted that the length of said ram is much greater than the length of said bore. Since it is just as desirable to provide for movement of ram 26 relatively to saddle 14 along the horizontal axis of bore 25 (which axis is coincident with the axis of said ram) as it is to provide for vertical movement of said saddle relatively to column 10 along guide means 15—16 under the influence and control of motor 19, means are provided for doing so, these means comprising a horizontally extending rack formation 27 on the outer surface of said ram, a pinion 28 in driving mesh with said rack formation and carried on a vertical shaft 29 for rotation therewith, a gear 30 also carried on said shaft for rotation therewith, a second pinion 31 in driving mesh with said gear 30 and carried on a second vertical shaft 32 for rotation therewith, and a second gear 33 also carried on said shaft 32 for rotation therewith, the drive for said gear 33 to be presently described, but it being sufficient at this time to say that said drive is selectiely employable and selectively reversible. It is to be noted that shafts 29 and 32 are journalled in bearings provided therefor on saddle 14 and that said saddle is open at positions opposite pinion 28 and gear 30 so that said pinion may engage rack formation 27 and said gear may engage pinion 31. It is clear that rotation of shaft 32 in either of its two possible directions causes rectilinear movement of ram 26 along its horizontal axis relatively to saddle 14 in either of its two directions.

The means for driving gear 33 (to move ram 26 relatively to saddle 14 along its horizontal axis) comprise a motor-pinion unit 34—35 carried by said saddle and preferably rotatable selectively in either of two directions about a vertical axis, a vertical shaft 36 journalled for rotation about its axis in bearings provided therefor on said saddle and carrying rotatably therewith a gear 37 in driven mesh with another gear 38 which is simultaneously in driven mesh with said pinion 35 and rotatably mounted on a pin 39 carried by said saddle, a pinion 40 also mounted on said shaft 36 for rotation therewith, a gear 41 in driven mesh with said pinion 40 and rotatably mounted on another pin 42 also carried by said saddle, a gear 43 in driven mesh with said gear 41 and mounted on and for rotation with a vertical shaft 44 carried in bearings provided therefor on said saddle, a pinion 45 (of the bevel type) also mounted on said shaft 44 for rotation therewith, a gear 46 (of the bevel type) in driven mesh with said pinion 45 and mounted on and for rotation with a horizontal shaft 47 journalled in bearings provided therefor on said saddle, a manually operable clutch member 48 carried on said shaft 47 for rotation therewith and axial movement therealong, and an integrated clutch member-bevel pinion unit 49—50 freely carried on said shaft 47 as far as rotation is concerned but unable to move axially therealong, the pinion 50 of said unit 49—50 being in constant driving mesh with said gear 33 and the clutch member 49 of said unit 49—50 being selectively engaged or disengaged by said clutch member 48 by the manual operation of a shifter 51 which is operatively connected to said member 48 and extends outwardly from said saddle to be accessible thereat. With clutch member 48 in the position shown in Fig. 1, rotation of motor 34 will have no rectilinear driving effect upon ram 26 because, though shaft 47 is rotating, clutch 48—49 is disengaged (it being remembered that member 49 is free on said shaft); so, clutch 48—49 must be engaged if horizontal movability of said ram relatively to saddle 14 is desired. And, with clutch 48—49, engaged, it is readily seen that ram 26 may be moved horizontally relatively to saddle 14 in one direction during rotation of motor 34 in one direction, or it may be moved in the opposite direction during motor rotation in the opposite direction, thereby meeting any desire for cutting tool protraction or retraction, just as the desire for tool level adjustability is met by operation of motor 19 in either one or the other of its two directions of rotation.

Before proceeding further with the description, it might be repeated that, as shown, vertical movement of saddle 14 in either one or the other of two directions relatively to column 10 depends upon motor 19 having bi-directional characteristics, and horizontal movement of ram 26 in either one or the other of two directions relatively to said saddle depends upon motor 34 also having bi-directional characteristics. However, it is clear that some one or other of the well known reversible gearing arrangements, or other means, could be installed in the line of action between motor 19 and saddle 14 and in the line of action between motor 34 and ram 26 so as to negative the necessity for having said motors bi-directionally movable. The use of such equivalents is contemplated.

Ram 26 is centrally formed therethrough in the direction of the length thereof with a cylindrical bore 52 in which is received and journalled an elongated arbor 53, said arbor being rotatable relatively to said ram about the axis of said bore but being held against axial movement relatively thereto by means of a thrust nut 54 secured to said ram and abutting a shoulder provided therefor on said arbor. It is to be noted that one end of arbor 53 extends outwardly of bore 52 slightly beyond the rear end of ram 26, whereas the opposite end of said arbor extends to a position within said bore behind and well spaced from the forward end of said ram, the reason for which will presently be understood. For rotating arbor 53 about the axis of bore 52 (which axis is common to the horizontal axes of ram 26, bore 25 and said arbor) relatively to said ram, a motor 55 is employed, it being stationarily carried by the upper portion of column 10 and its shaft 56 being journaled in bearings provided therefor on said column and rotatable about a vertical axis. Shaft 56 is splined along at least a portion of its length, as at 57, and freely passes through a bifurcated boss 58 formed integrally on saddle 14, there being a pinion 59 journalled for rotation between the arms of said boss and carried on said shaft for rotation therewith and movement therealong (under the influence of any vertical movement of said saddle relatively to column 10). Pinion 59 is in driving mesh with a gear 60 carried on a pin 61 supported by saddle 14, and said gear is, in turn, in driving mesh with another gear 62 carried on and for rotation with the upper end of a vertical shaft 63 journalled in a bearing 64 provided therefor and formed integrally on said saddle. A pinion 65 (of the bevel type) is carried on the lower end of shaft 63 for rotation therewith and is in driving mesh simultaneously with a pair of gears 66 and 67 (also of the bevel type) freely carried on a horizontal shaft 68 journalled in bearings provided therefor on saddle 14. It will be noted that the forward end of shaft 68 terminates at its bearing, which is well behind the forward end of saddle 14, whereas the rear end of said shaft extends rearwardly to a position well behind its bearing, which is in the rear wall of said saddle, said shaft per se having no axial movement relatively to said saddle. It will further be noted that, in order to drive shaft 68 in either of its two possible directions of rotation under the influence of unidirectional rotation of motor 55, said shaft is splined, as at 69, along the portion of the length thereof residing intermediate gears 66 and 67, and on said spline a double-faced clutch member 70—71 is mounted for rotation therewith and axial movement therealong, said member being operatively connected to a manually operable shifter 72 which extends outwardly through saddle 14 to be accessible thereat, said gear 66 being integrally provided with a clutch face 73 for engagement therewith by face 70 of said member 70—71 upon actuation of said shifter in one direction to rotate said shaft in one of said two possible directions, and said gear 67 being likewise integrally provided with a clutch face 74 for engagement therewith by face 71 of said member 70—71 upon actuation of said shifter in a reverse direction to rotate said shaft in the other of said two possible directions.

Continuing the description of the means for rotating arbor 53 relatively to ram 26, the rearwardly extending portion of rotatable, non-axially movable shaft 68 is splined, as at 75, along a portion of its length and receives a pinion 76 which is rotatable therewith and axially movable therealong. A gear 77 is supported on and about the end of arbor 53 for both rectilinear and rotary movements unitarily therewith and is in constant driven mesh with pinion 76. So, it is seen that arbor 53 may be rotated relatively to ram 26 in either of two directions depending upon the position of shifter 72 and activity of motor 55, and this is so regardless of the relative, horizontal positioning or movement of said ram with respect to saddle 14 (because of the splined connection between shaft 68 and pinion 76) or regardless of the relative, vertical positioning or movement of said saddle with respect to column 10 (because of the splined connection between shaft 56 and pinion 59). As noted, pinion 76 and gear 77 are housed within a casing 78 which tends, among other things, to provide bearing means for said pinion and the rear end of shaft 68 and is itself centrally, non-rotatably supported about the rear end of ram 26 for rectilinear movement unitarily with said ram and arbor 53, said casing having an opening 79 therein opposite said shaft so as to receive the latter upon protraction of the unit 26—53—78 relatively to said shaft under the influence of motor 34 when clutch 48—49 is engaged.

Arbor 53 is hollow throughout its length, it being centrally provided with a cylindrical bore 80, and in said bore there is received an elongated tool-supporting spindle 81 which is externally formed along its length with circumferentially spaced keyways 82 in which are received keys 83 carried by the wall of said bore for rotation and axial movement unitarily therewith, said keys and keyways providing the agency through which said spindle is made rotatable unitarily with said arbor but yet permitting axial movement of said spindle relatively to said arbor. For practical purposes, it is best that the length of spindle 81 be such that, when it is fully retracted with respect to ram 26 and arbor 53, its front end (which is operable, as can readily be seen, for carrying the tool desired) will be confined within the machine.

So that spindle 81, which is rotatable unitarily with arbor 53 due to connection 82—83 therebetween, may be horizontally protracted or retracted relatively thereto, when desired, said spindle is formed hollow throughout its length for receiving an elongated screw drive 84 which is in driving connection with said spindle through the agency of a nut 85 fixedly secured to the inner end of said spindle and threadedly receiving said screw. A portion of the rear end of screw 84 is unthreaded and journalled in a bearing 86 carried in bore 80 at the rear end thereof, said bearing being fixed against rotation or axial movement relatively to arbor 53, and said screw being fixed against axial movement relatively to said bearing and arbor but being free to rotate relatively thereto; on the other hand, the extreme rear end of said screw carries for rotation therewith a gear 87. At this point, attention is redirected to pinion 76 (carried on horizontal shaft 68) which is seen to have another pinion 88 (of the bevel type secured thereto or formed integrally therewith so as to rotate unitarily with said shaft and first pinion, said second pinion being in driving mesh with a gear 89 (also of the bevel type) carried for rotation on and with a vertical shaft 90 journalled in the upper arm of a bifurcated bearing 91 provided therefor on casing 78. Shaft 90 extends through the upper wall of another and smaller casing 92 supported between the two arms of bearing 91, and on the lower end of said shaft there is mounted for rotation therewith a pinion 93 (of the bevel type) which is in driving mesh simultaneously with a pair of gears 94 and 95 (also of the bevel type) journalled for rotation about horizontal axes in bearings provided therefor in said casing. In driven mesh simultaneously with gears 94 and 95 is a gear 96 (of the bevel type) which is mounted on and for rotation with a vertical shaft 97 passing through the lower wall of casing 92 and into journalled support with the lower arm of bearing 91, the lower end of said shaft carrying for rotation therewith a pinion 98 (also of the bevel type) in driving mesh with a gear 99 (also of the bevel type) carried on and for rotation with a horizontal shaft 100 journalled in bearings provided therefor on casing 78. Shaft 100 carries also for rotation therewith a pinion 101 which is in driving mesh with aforementioned gear 87. It is to be noted that the ratio of the diameters of pinion 76 and gear 77 is the same as the ratio between the diameters of pinion 101 and gear 87, and that the drive in each case between pinion 88 and gear 89, pinion 93 and gears 94, 95 and 96, and pinion 98 and gear 99 is 1:1, so that, with no rotation of casing 92 (which casing is, however, rotatable, as will soon be seen), activity of motor 55 and positioning of shifter 72 in one of its two positions will cause rotation of arbor-spindle 53—81 and of screw 84 in a common direction and at a common speed, whereas positioning of said shifter into the other of its two positions will simply reverse said direction of rotation, the speed remaining the same. In other words, during inactivity of casing 92, activity of motor 55 and residence of shifter 72 in either of its two positions of operation, there will be no relativity between the rotation of arbor-spindle 53—81 and the rotation of screw 84 and, thus, no relativity between the axial movements of arbor-screw 53—84 and the axial movements of spindle 81.

However, as can readily be appreciated, protraction or retraction of spindle 81 relatively to arbor 53 and screw 84 is often necessary and desirable, and, for this reason, means have been provided for selectively effectuating such relativity. Returning attention to shaft 47, which is operable for axially moving ram 26 (and, therefore, arbor 53, screw 84 and spindle 81) during activity of motor 34 and engagement of clutch 48—49, it will be noted that said shaft carries at its rear end a driving clutch member 102 which is rotatable therewith and non-axially movable therealong. In axial alignment with shaft 47 there is supported another shaft 103 which is journalled in bearings provided therefor in nonaxially movable saddle 14 and axially movable casing 78' the forward end of said shaft 103 carrying for rotation therewith and axial movement therealong a driven clutch member 104 which is actuated by means of a shifter 105 operatively connected to said member 104 for selectively moving the latter into and out of driven engagement with driving clutch member 102 and extending outwardly from said saddle to be accessible thereat, and the rear end of said shaft 103 being splined along a portion of its length, as at 106, and carrying a pinion 107 (of the bevel type) for rotation therewith and axial movement therealong, the bearing provided in said casing for supporting said shaft 103 accommodating said spline so that the unit 78—107 may move axially relatively to said shaft 103 similarly as does unit 78—76—88 relatively to shaft 68 during ram protraction or retraction relatively to saddle 14. A gear 108 (of the bevel type) is supported on the lower end of a vertical shaft 109 for rotation therewith and in driven mesh with pinion 107, said shaft being journalled in bearings provided therefor in casing 78, and along a portion of the length of said shaft there is formed a spline 110 rotatably connected to which is a pinion 111 and which latter pinion is in driving mesh with a gear formation 112 on the exterior of rotatable casing 92.

Now, remembering that the rotative speeds of pinion 93 and gear 96 must be equal in order that the rotative speeds of screw 84 and arbor-spindle unit 53—81 be equal, so that there will be no longitudinal movement of said spindle relatively to said screw and said arbor, and assuming motor 55 is operating, operation of motor 34 and engagement of clutch 102—104 (the condition of clutch 48—49 is immaterial and may be ignored) cause rotation of casing 92. If the rotation of casing 92 is in the same direction as that of pinion 93 (which can be made so by properly positioning driven clutch member 70—71 carried on shaft 68 and/or properly selecting the direction of rotation for motor 34), it is readily seen that the normal driving effect between said pinion and gears 94 and 95 is reduced to a certain extent because said pinion and gears are rotating in the same direction about the same axis, the results being that gear 96 will not be rotating at the same speed as said pinion (because said gears 94 and 95 will be merely riding over said gear 96), gear 87 will not be rotating at the same speed as gear 77, and the resulting relative rotation between screw 84 and arbor-spindle unit 53—81 will cause longitudinal movement of said spindle relatively to said screw. On the other hand, if casing 92 is caused to rotate in a direction opposite the direction of rotation of pinion 93, gears 94 and 95 will drive gear 96 faster than if by said pinion alone and the results will be the same as above, though, of course, of a relative nature.

If desired, the rear face of driven clutch member 104 may be serrated, as at 113, for engagement with an arm or stop 114 formed on saddle 14 when said member is disengaged from driving clutch member 102. This engagement between elements 113 and 114 positively assures inactivity of shaft 103 during disengagement of clutch 102—104 and activity of motors 55 and/or 34, which means that there will be absolutely no inadvertent rotation of casing 92 when such rotation is not desired.

As has been previously pointed out, the front end of arbor 53, which arbor is rotatable but axially immovable relatively to ram 26, is spaced behind the front end of said ram, and, ahead of said first front end, in bore 52 which receives said arbor, there is supported the rearwardly extending, externally cylindrical skirt portion 115 of an annular plate or support 116 which is radially outwardly extending immediately ahead of said second front end, said skirt and said plate being integral, centrally formed to provide an aligned continuity of bore 80 which receives spindle 81 and, like said arbor, rotatable but axially immovable relatively to said ram because of a plurality of pins 117 which are securely positioned in annularly spaced pockets provided therefor in said ram and fit rather snugly in an annular groove formed radially opposite same in said skirt, it being noted that skirt-plate unit 115—116 is separate from said arbor and not, therefore, rotatable therewith or responsive to the rotation thereof. As indicated, skirt-plate unit 115—116 internally receives spindle 81 without interfering with the latter's axial or rotary movements, and one of the purposes of the former is to carry fixedly therewith, at its front end and centrally with respect thereto, an annular head plate or support 118 by means of a series of annularly spaced, rigidly interconnecting screws or other fastening means 119, it being noted that said spindle is functionally independent also with respect to said plate 118 and that it is extensible to positions either thereahead or therebehind. Whereas arbor 53, spindle 81 and screw 84 are normally rotated unitarily about the common axis thereof by motor 55 through the drive train which terminates at pinion 76, integrated unit 118—116—115 is selectively rotated about the same axis by the same motor but through a drive train which terminates at a pinion 120 which is in driving mesh with an external gear 121 formed on plate 116 of said unit 118—116—115. Pinion 120 is fixedly supported on the front end of a horizontal shaft 122 for rotation and axial movement therewith, said shaft extending rearwardly through a bearing provided therefor and rotatably carried in the front upper wall of saddle structure 14 and being longitudinally splined, as at 123, similarly as some of the aforementioned shafts and for similar reasons. The bearing which is carried by saddle 14 and in which shaft 122 is received for rotation therewith and axial movement relatively thereto has integrally formed therewith at its rear end a gear 124 which is in driven mesh with a pinion 125 fixedly carried on the front end of a horizontal shaft 126 journalled at said front end in a bearing provided therefor in said saddle directly below said first bearing and at its rear end in that bearing which also receives and supports the front end of shaft 68 and gear-clutch member unit 67—74. Shaft 126 is splined for a portion of its length, as at 127, for receiving a driven clutch member 128 which is operatively connected to a shifter 129 supported by saddle 14 and extending externally thereof to be accessible thereat, said member being rotatable with said shaft and selectively movable therealong into and out of clutching engagement with a driving clutch member 130 which is integral with unit 67—74 and freely carried on said shaft, just as said unit is freely carried on shaft 68. It will be noted, then, that activity of motor 55 and engagement of clutch 128—130 cause rotation of unit 118—116—115 about the central axis thereof and that this rotation may be realized whether unit 53—81—84 is rotating (when clutch 74—71 is engaged, or when clutch 70—73 is engaged) or not (when driver 71—70 is intermediate driven elements 74 and 73).

The main purpose of unit 118—116—115 is to provide a support for a cutting tool which may be used instead of or in conjunction with the tool which is supported by spindle 81, and it will be seen further on in this description that said first tool has been made adaptable for rotation about the same axis along and about which said second tool is movable and for radial movement toward and away from said axis. To attain these ends, the front face of head plate 118 is formed to provide a centrally arranged, radially extending, dove-tail groove 131 in which is movably received the bevelled side walls of a carrier member 132, the front face of said carrier being adapted for carrying movably therewith the first of the two above mentioned tools. Carrier 132 is formed therethrough with a radially elongated opening 133 so that said carrier, like unit 118—116—115, may receive spindle 81 without interfering therewith and also be moved toward and away therefrom when such movement is desired. The rear face of carrier 132 is integrally formed with an ear or lug 134 which extends into a chambered portion 135 residing in head plate 118, and said lug is formed with a threaded bore having an axis normal to the common axis of rotation of said carrier and plate and threadedly receiving a rotatable screw drive 136. Screw 136 is journalled for rotation at its head end in the peripheral wall of plate 118 radially outwardly of chamber 135 and secured thereat against movement along its axis, so that, as can be readily seen, rotation of said screw in one direction or the other about said axis will move carrier 132 and its tool along guide 131 toward or away from the axis of spindle 81 (which is the same as the axis of said carrier) and relatively to unit 118—116—115.

Though it is true that screw 136 is rotatable about its axis to move carrier 132 and its tool radially with respect to the axis of rotation of said carrier and relatively to unit 118—116—115 (the means for accomplishing this will soon be described), it is to be pointed out that said screw is normally inactive as far as its rotatability is concerned so that the movement of said carrier-tool is purely rotatable (when clutch 128—130 is engaged and motor 55 operating). To explain, screw 136 has fixed thereon for rotation therewith a gear 137 (of the bevel type), and in driving engagement with said gear is a pinion 138 (also of the bevel type) fixedly carried on one end of a horizontal shaft 139 which is rotatably journalled in wall portions of plates 118 and 116 and extends into chamber 135. Shaft 139 also carries a gear 140 which is rotatable therewith and disposed between the walls of plates 118 and 116 carrying said shaft, said gear being in driven mesh with an internal gear (pinion) 141 carried by said plates for rotation therewith and also relatively thereto about the common axis thereof. The internal driving formation 141 is integrally provided with an external gear formation 142 which is in driven mesh with an idler gear 143 carried for rotation about a stationary, horizontal axis on the front wall of an annular, non-rotatable housing or support 144 telescopically arranged at the front end of its hub about the head end of the machine under discussion and rigidly fixed and supported at the rear end of its hub directly ahead of saddle 14 to and by ram 26 for movement therewith. Gear 143 is in driven mesh with another idler gear 145 carried for rotation about a stationary, horizontal axis also on the front wall of support 144, and said gear 145 is in driven mesh with a pinion 146 supported on a horizontal shaft 147 for rotation therewith. Shaft 147 is journalled for rotation about its axis in the front and rear walls of housing 144 and extends rearwardly from the latter through the front and rear walls of the upper portion of saddle 14, said front wall of said saddle portion carrying a bearing 148 which is sleeved about and cooperable with an elongated spline 149 formed on the rear end of said shaft, and said rear wall of said saddle portion having an opening 150 through which said shaft is freely extensible. Bearing 148 is integrally formed at its rear end with a gear 151 (of the bevel type), and this gear is in driven mesh with a pinion 152 (also of the bevel type) fixedly carried on and for rotation with the upper end of a vertical shaft 153 supported by an upper bearing plate 154 formed on and extending rearwardly from the front wall of saddle 14. Shaft 153 is journalled in and extends through the upper wall of a casing 155 which is similar in every substantial detail to casing 92, the lower end of said shaft carrying for rotation therewith a gear 156 (of the bevel type) which is in driven mesh simultaneously with a pair of other gears 157 and 158 (also of the bevel type) supported by said casing 155 for rotation about aligned, horizontal axes. In driving mesh with gears 157 and 158 is a pinion 159 (of the bevel type) which is fixedly supported on and for rotation with the upper end of a vertical shaft 160 aligned with shaft 153, said shaft 160 being journalled in and extending through the lower wall of casing 155 and also a lower bearing plate 161 integrally formed on and extending rearwardly from the front wall of saddle 14 similarly as plate 154 but therebelow. Shaft 160 fixedly carries at its lower end below plate 161 a gear 162 (of the bevel type), and this gear is in driven mesh with a pinion 163 (also of the bevel type) mounted on and for rotation with horizontal, splined shaft 122—123.

It will be seen that the drive between pinion 163 and gear 162 is 1:1, that it is also 1:1 between pinion 159 and gears 157 and 158, between said gears 157 and 158 and gear 156, and between pinion 152 and gear 151, and that the drive from pinion 146, thence through gears 145, 143 and 142 and pinion 141 to gear 140 is the same as the drive between pinion 120 and gear 121. In other words, with motor 34 operating, clutch 128—130 engaged and casing 155 stationary (this casing, as will be seen, is selectively rotated but normally idle, similarly as is casing 92), unit 118—116—115 will be rotating at a certain speed about its central axis, carrying gear 137, pinion 138 and gear 140 along therewith, and there will be no rotation of shaft 139 about its own axis because pinion-gear 141—142 will be rotating at the same speed as said unit and about the same axis. This means that there will be no rotation of screw 136 about its own axis and that, therefore, tool carrier 132 will be moving purely rotatably (about the spindle axis). It will be noted that the splined connections between shaft 122—123 and gear-pinion 124—163 and between shaft 147—149 and bearing-gear 148—151 permit unitary, axial movement of ram-arbor-housing unit 26—53—144 and skirt-plate-support unit 115—116—118 relatively to saddle 14 under the influence of motor 34 while clutch 48—49 is engaged.

Selective rotation of casing 155, in order that tool carrier 132 may be moved radially along guides 131 with respect to the axis of spindle 81, may be provided for by forming said casing with an external gear formation 164 which is in driven mesh with a pinion 165 freely carried on the lower end of the vertical drive shaft of motor 34 directly above bearing plate 161. The upper hub portion of pinion 165 is integrally formed with a driven clutch member 166 which is operable for being engaged by or disengaged from a driving clutch member 167 carried on a splined portion 168 of the shaft of motor 34 for rotation therewith and for selective movement therealong under the influence of a manually operable shifter 169 operatively connected to said member 167 and extending outwardly of saddle 14 to be accessible thereat, said shifter having preferably fixed thereto for movement therewith a catch arm 170 which engages and insures non-rotatability of unit 166—165 during disengagement of clutch 166—167 and which is free of said unit during engagement of said clutch. It will be seen, then, that, during operation of motor 34 and engagement of clutch 166—167, casing 155 will rotate about the common axis of shafts 153 and 160, carrying gears 157 and 158 therewith, the result being that the driving effect of pinion 159 upon said gears 157 and 158 and of said gears 157 and 158 upon gear 156 will be either increased or decreased with respect to the normal value thereof (depending upon the direction in which said casing is rotated), thereby causing the pinion-gear unit 141—142 to be driven either faster or slower than unit 118—116—115 and thus setting up a rotation of shaft 139 about its own axis during movement thereof about the axis of spindle 81. This selective rotation of shaft 139 about its own axis, of course, causes rotation of screw 136 and this, in turn, causes radial movement of tool carrier 132 along guides 131.

In conclusion, then, it has been seen that the tools carried by the carriers 81 and 132 may be rotated in either of two directions either individually or unitarily about a common axis, the axis of said carrier 81; they may be protracted or retracted either individually or unitarily along said axis; the radial distance between said axis and the tool carried by said carrier 132 may be changed at will either during rotation and/or axial movement thereof or not; and said protractile, retractile, radial, axial and rotational movements may be carried on unitarily, individually or with any combination thereof whatsoever.

Referring to Fig. 6, which shows a slightly modified arrangement at the working end of the machine, the tool-carrying end of spindle 81, instead of being employed for directly supporting a tool, as it is presumed to be in Figs. 1 through 5, may have attached thereto for movement therewith a bevel pinion 171 which is in driving mesh with a bevel gear 172 keyed to and for rotation with a shaft 173, said shaft being journalled in bearings provided therefor in a housing 174 supported by the head plate 118 and itself carrying for rotation therewith a tool 175 of any desired design.

Finally, referring to Fig. 7, which shows another modification, spindle 81 may carry at its forward end for rotation therewith a pinion 176 which is in driving mesh with a gear 177 keyed for rotation to and with a shaft 178 journalled for rotation in bearings provided therefor in a housing 179, said housing being supported by the head plate 118, and said shaft carrying for rotation therewith a tool 180 of any desired design.

Although the invention has been described with some detail it is not intended that such description is to be definitive of the limits of the inventive idea. The right is reserved to make such changes in the details of construction and arrangements of parts as will fall within the purview of the attached claims.

What I claim is:

1. In a cutting machine, cutter carrying means having and being supported about an axis of rotation, screw means threadedly connected to said cutter carrying means and supported for rotation about said axis, driven means operatively connected to said cutter carrying means for rotation therewith, drive means operatively connected to said driven means and movable about an axis spaced from said first axis for rotating said cutter carrying means about said first axis at a predetermined speed, driven means operatively connected to said screw means for rotation therewith, drive means operatively connected to said second driven means and driven by said first drive means about an axis spaced from said first two axes for rotating said screw means about said first axis at said speed, and a support for said two drive means and stationary with respect thereto.

2. In a cutting machine, cutter carrying means having and being supported about an axis of rotation, screw means threadedly connected to said cutter carrying means and supported for rotation about said axis, driven means operatively connected to said cutter carrying means for rotation therewith, drive means operatively connected to said driven means for rotating said cutter carrying means about said axis at a predetermined speed, driven means operatively connected to said screw means for rotation therewith, drive means operatively connected to said second driven means and movable about an axis spaced from said first axis for rotating said screw means about said first axis at said speed, and speed changing means operable selectively for effectuating a relativity between the rotative speeds of said two driven means whereby said cutter carrying means and said screw means may be moved relatively one to the other along said first axis.

3. In a cutting machine, cutter carrying means having and being supported about an axis of rotation, screw means threadedly connected to said cutter carrying means and supported for rotation about said axis, driven means operatively connected to said cutter carrying means for rotation therewith, drive means operatively connected to said driven means for rotating said cutter carrying means about said axis at a predetermined speed, driven means operatively connected to said screw means for rotation therewith, drive means operatively connected to said second driven means and movable about an axle spaced from said first axis for rotating said screw means about said first axis at said speed, a support for said two drive means and stationary with respect thereto, and speed changing means operable selectively for effectuating a relativity between the rotative speeds of said two driven means whereby said cutter carrying means and said screw means may be moved relatively one to the other along said first axis.

4. In a cutting machine, cutter carrying means having and being supported about an axis of rotation, screw means threadedly connected to said cutter carrying means and supported for rotation about said axis, driven means operatively connected to said cutter carrying means for rotation therewith, drive means operatively connected to said driven means for rotating said cutter carrying means about said axis at a predetermined speed, driven means operatively connected to said screw means for rotation therewith, drive means operatively connected to said second driven means and driven by said first drive means about an axis spaced from said first axis for rotating said screw means about said first axis at said speed, and speed changing means arranged in driven connection with one of said two drive means and in driving connection with the other of said two drive means and operable selectively for effectuating a relatively between the rotative speeds of said two driven means whereby said cutter carrying means and said screw means may be moved relatively one to the other along said first axis.

5. In a cutting machine, cutter carrying means having and being supported about an axis of rotation, screw means threadedly conencted to said cutter carrying means and supported for rotation about said axis, driven means operatively connected to said cutter carrying means for rotation therewith, drive means operatively connected to said driven means for rotating said cutter carrying means about said axis at a predetermined speed, driven means operatively connected to said screw means for rotation therewith, drive means operatively connected to said second driven means and driven by said first drive means about an axis spaced from said first axis for rotating said screw means about said first axis at said speed, a support for said two drive means and stationary with respect thereto, and speed changing means arranged in driven connection with said first drive means and in driving conection with said second drive means and operable selectively for effectuating a relativity between the rotative speeds of said two driven means whereby said cutter carrying means and said screw means may be moved relatively one to the other along said first axis.

6. In a cutting machine, an elongated, non-rotatable support formed in the direction of its length with a bore, a second elongated support rotatably carried within said bore and itself formed in the direction of its length with a bore, a third elongated support rotatably carried within said first bore in end-to-end relationship with said second support and itself formed with a bore in axial alignment with said second bore, a cutter carrier rotatably carried within second and third bores and operatively connected to said second support for rotation therewith independently of said third support, and a second cutter carrier operatively connected to said third support for rotation therewith independently of said first carrier.

7. In a cutting machine, an elongated, non-rotatable support formed in the direction of its length with a bore having an axis, a second elongated support rotatably carried within said bore and itself formed in the direction of its length with a bore having an axis coincident with said first axis, a third elongated support rotatably carried within said first bore in end-to-end relationship with said second support and itself formed with a bore having an axis coincident with said first axis and aligned with said second axis, a cutter carrier rotatably carried within said second and third bores and operatively connected to said second support for rotation therewith about said axes independently of said third support, and a second cutter carrier operatively connected to said third support for rotation therewith about said axes independently of said first carrier.

8. In a cutting machine, an elongated support formed in the direction of its length with a bore, a second elongated support carried within said bore and itself formed in the direction of its length with a bore, a third elongated support carried within said first bore in end-to-end relationship with said second support and itself formed in the direction of its length with a bore aligned with said second bore, a pair of cutter carriers one of which being supported within said second and third bores and the other of which being supported by said third support, means operable for unitarily rotating said second support and said one carrier relatively to said first support and independently of said third support and said other carrier, and means operable for unitarily rotating said third support and said other carrier relatively to said first support and independently of said second support and said one carrier.

9. In a cutting machine, an elongated support formed in the direction of its length with a bore, a second elongated support carried within said bore and itself formed in the direction of its length with a bore, a third elongated support carried within said first bore in end-to-end relationship with said second support and itself formed in the direction of its length with a bore aligned with said second bore, a pair of cutter carriers one of which being supported within said second and third bores and the other of which being supported by said third support, means operable for unitarily rotating said second support and said one carrier relatively to said first support and independently of said third support and said other carrier about a predetermined axis, and means operable for unitarily rotating said third support and said other carrier relatively to said first support and independently of said second support and said one carrier about said axis.

10. In a cutting machine, a pair of cutter carrying means supported for independent movement with respect to a common axis, a pair of drive means operatively connected to said pair of cutter carrying means, means for moving the latter selectively about said axis, another pair of drive means operatively connected to said cutter carrying means, means for moving one of the cutter carrying means along said axis and the other of the cutter carrying means toward and away from said axis, a pair of variable speed control means one of which operatively interconnects one of said first pair of drive means and one of said second pair of drive means and the other of which operatively interconnects the other of said first pair of drive means and the other of said second pair of drive means for controlling the speed and movements of said pair of cutter carrying means relatively one to the other.

HENRY EARL MORTON.